Figure 1:
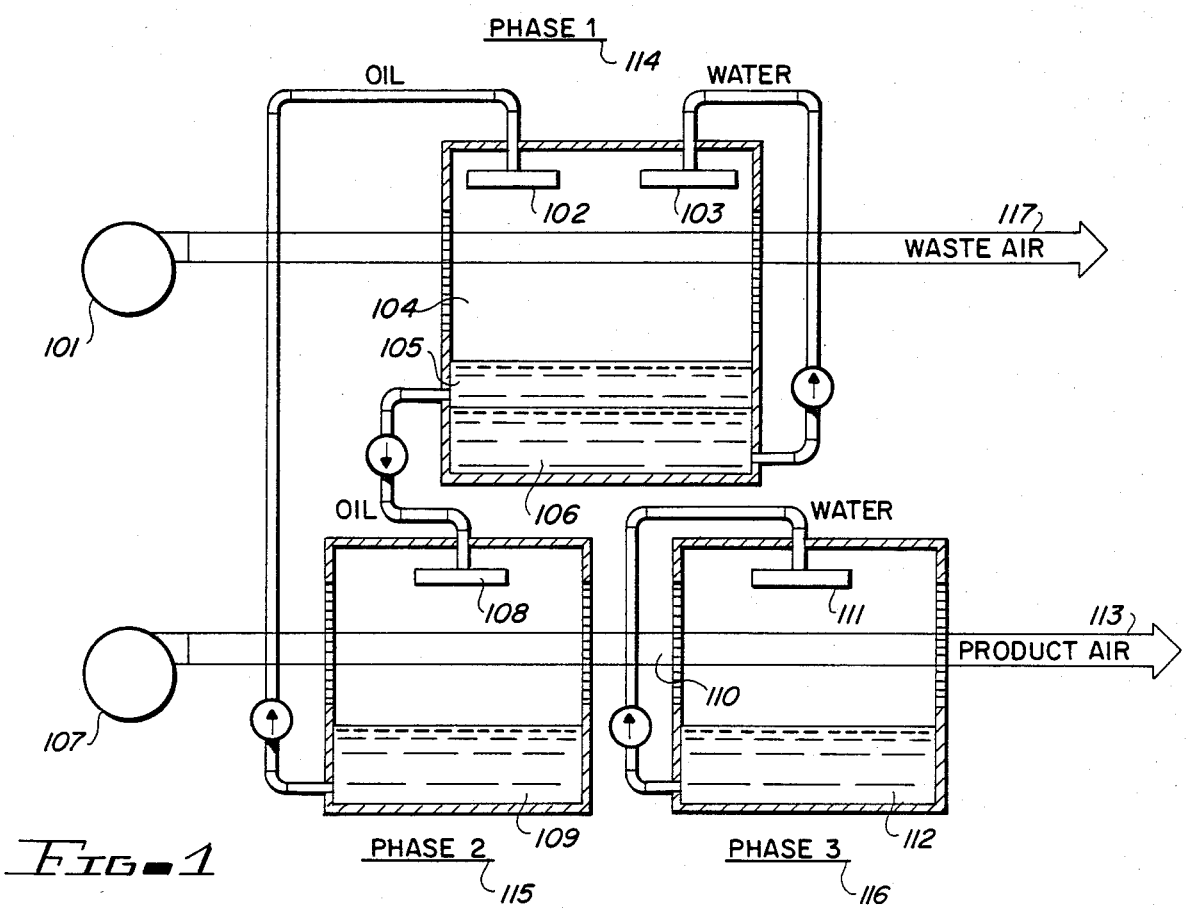
Figure 2:
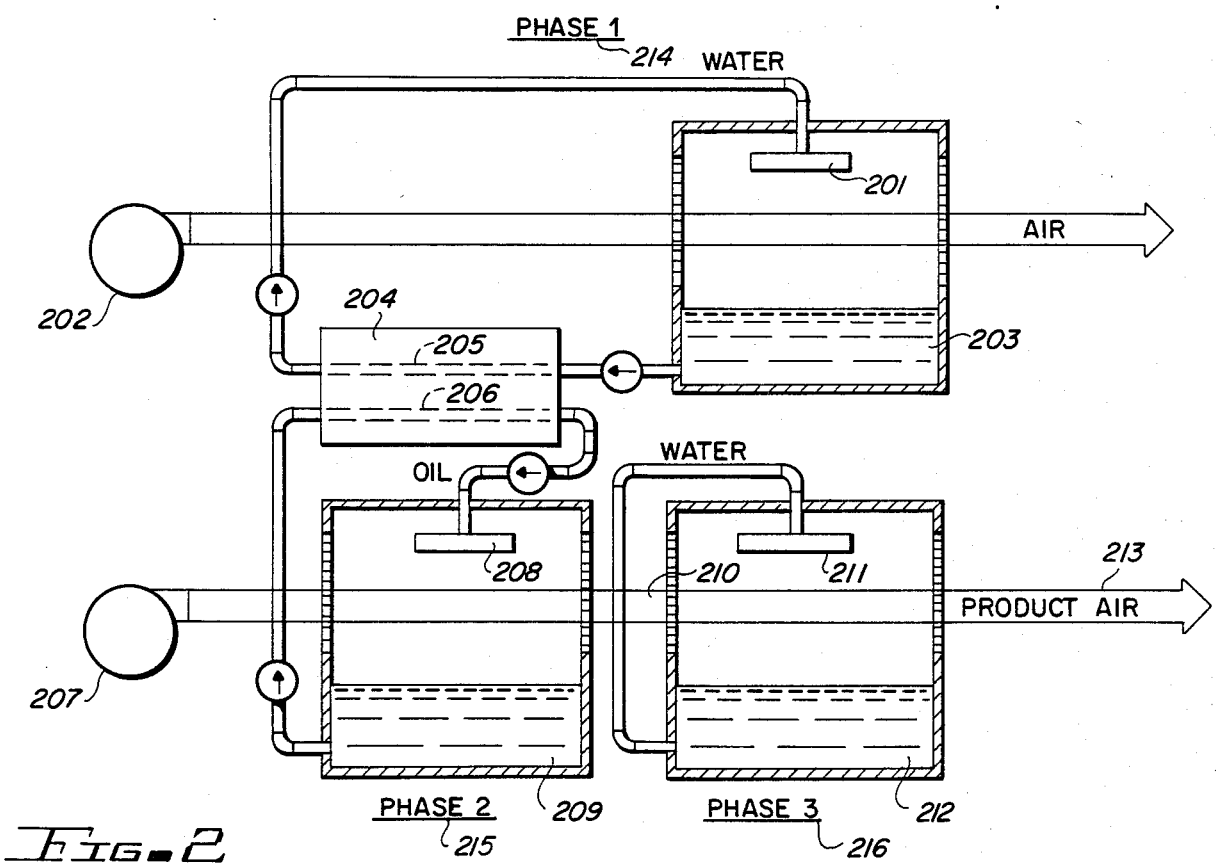
Figure 3:
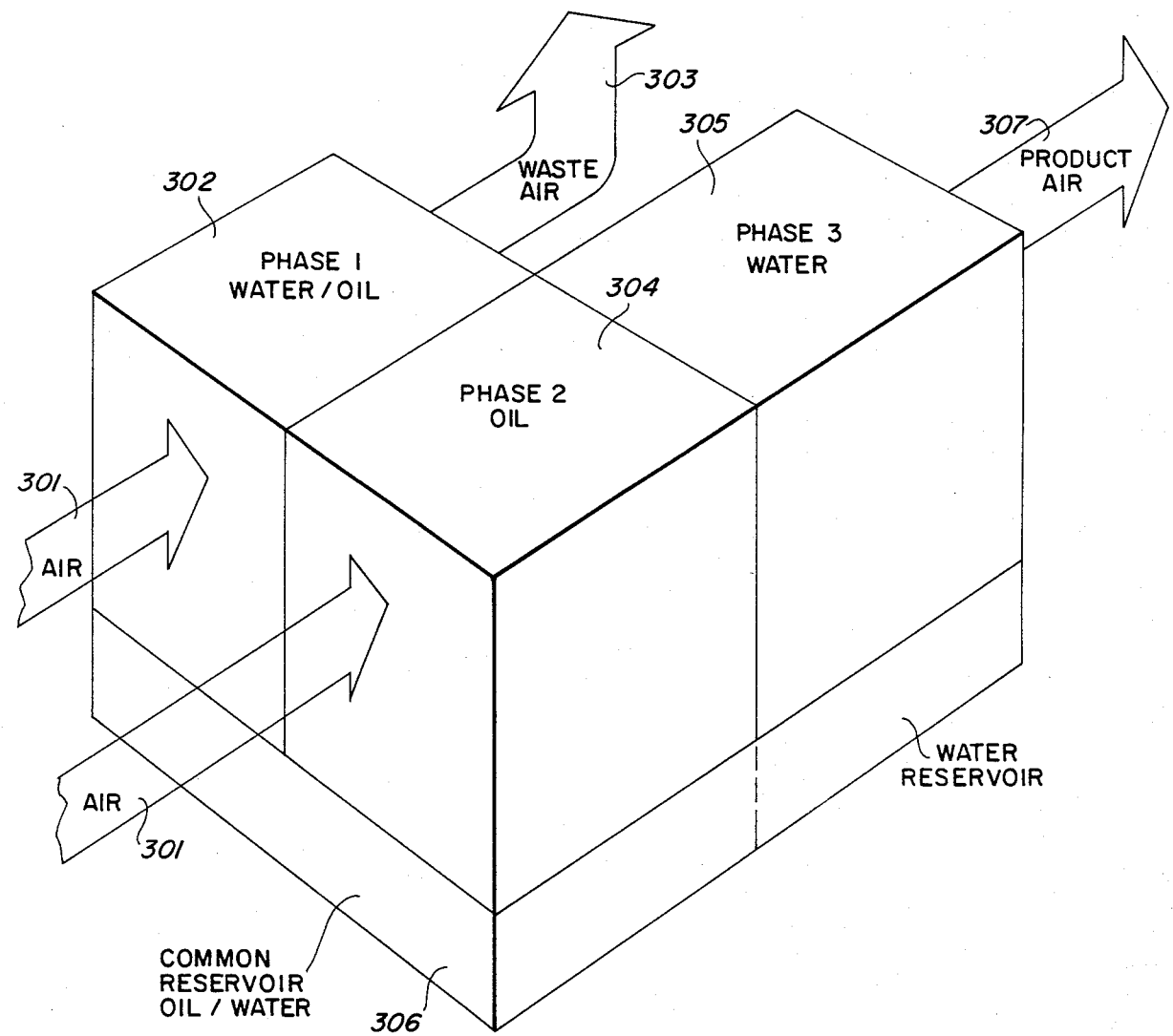

United States Patent [19]

Thompson

[11] Patent Number: 4,532,777
[45] Date of Patent: Aug. 6, 1985

[54] TWO STAGE COOLING SYSTEM

[75] Inventor: Tommy L. Thompson, Tucson, Ariz.

[73] Assignee: University of Arizona Foundation, Tucson, Ariz.

[21] Appl. No.: 497,267

[22] Filed: May 23, 1983

[51] Int. Cl.³ .............................................. F25D 17/02
[52] U.S. Cl. ........................................ 62/434; 62/93; 62/96
[58] Field of Search .................. 62/93, 94, 91, 96, 434

[56] References Cited

U.S. PATENT DOCUMENTS

| | | | |
|---|---|---|---|
| 2,017,027 | 10/1935 | Forrest | 62/93 |
| 2,798,570 | 7/1957 | Kelley | 62/94 |
| 3,232,029 | 2/1966 | Evans, Jr. | 62/93 |
| 3,417,574 | 12/1968 | Kelley | 62/94 |
| 3,521,460 | 7/1970 | Knowles | 62/95 |
| 3,890,797 | 6/1975 | Brown | 62/93 |

OTHER PUBLICATIONS

Mason, G. S., "Decanting without Interface Control", Chemical Engineering, pp. 129–130, Sep. 20, 1982.
Stull, D. R., "Fundamentals of Fires and Explosion", AIChE Monograph Series, vol. 73, No. 10, 1977.

Primary Examiner—Ronald C. Capossela
Attorney, Agent, or Firm—Mark E. Ogram

[57] ABSTRACT

A two stage cooling system in which the first stage's cooling affect is transferred to the second stage through direct contact with an oil-like material. The oil-like material is cooled by direct contact with water which has been evaporatively cooled. The oil-like material is then utilized to cool the air stream prior to the second stage evaporative cooling. The use of an oil-like material in the first cooling stage of evaporative cooling allows a relatively dry air stream to be produced so as to fully capitalize upon the evaporative cooling affect of the second stage cooler.

18 Claims, 3 Drawing Figures

TWO STAGE COOLING SYSTEM

BACKGROUND OF THE INVENTION

This invention relates generally to cooling systems and more particularly to two stage cooling systems.

Two stage cooling systems are well known in the art and have been used for many years. Their usage in extense is well documented in the book, *Evaporative Airconditioning*, by John R. Watt, put out by The Industrial Press, (copyright 1963).

Basically, a two stage cooling system utilizes a first evaporative cooler to pre-cool the incoming air without increasing it's moisture content. This pre-cooled air is then passed on to the second stage which utilizes another evaporative cooler to further cool the air to a lower temperature.

A description of a two stage evaporative cooler is made by U.S. Pat. No. 3,521,460 issued to James A. Knowles on July 21, 1970. The Knowles patents pre-cools the outside air which is then further cooled by local stations within the interior of the building. In the Knowles patent, the cooling medium is chilled water. The cooling affect of the chilled water is made through heat exchangers in each location within the building.

Two primary restraints exists upon the current state of the art of a two stage cooler: the first being that the cost of a heat exchanger is commercially prohibitive. The second limitation is that a heat-exchange develops calcium carbonate or scaling which diminishes its effectiveness.

It is clear from the foregoing, that the present systems are either inefficent, or uneconomical for the tasks at hand.

SUMMARY OF THE INVENTION

In the perferred embodiment of the present invention utilizes a first and second cooling system. In the first cooling system, liquid water is mixed with an oil-like liquid. As the liquid water is cooled through evaporation, the oil, being in direct contact with the water, is also chilled. After chilling, the water and oil are separated, through any of the known methods of the art, and the oil is extracted therefrom.

The chilled oil is then utilized to cool, through direct contact, an air stream. This cooled air stream is "dry" in that it has not come in contact with the prior evaporative process.

The cooled air stream is passed to the second stage, being another evaporative type application, which utilizes the cooled "dry" air stream in a typical evaporative cooling process with water. In this manner, the air stream is cooled to it's final state which is used as the product.

Note that the full cooling ability of the second evaporative cooling is capitalized upon. The air it receives is not saturated but is "dry" since it has been cooled by direct contact with the oil which hasn't vaporized.

In another embodiment of the present invention, the first stage utilizes an evaporative cooler to cool a water reservoir. The water reservoir then has bubbled through it an oil-like substance. This oil-like substance is extracted and utilized in the same manner as in the prior description; that is, it is utilized to generate a cool "dry" air stream for use by the second stage evaporative cooling.

The bubbling of the oil through the resevoir has the same purpose as in the prior embodiment; the oil is placed in direct contact with the chilled water.

It is clear from the foregoing, that the present invention completely eliminates the traditional mechanical or metal heat exchange elements of the prior art. It is also clear, that the present invention generates from its first stage, a cool dry air stream which is compatable for many application in which a cool dry environment is necessitated.

INVENTION IN DETAIL

In the present invention, the first stage generates a cool dry air stream which is either usable by and of itself, or is further cooled in the second stage. To accomplish this task, the first stage utilizes the process of evaporative cooling. Evaporative cooling is well known in the art and is described in detail U.S. Pat. No. 3,890,797 issued to Ted Brown on June 24, 1975, incorporated hereinto by reference.

In one embodiment of the invention, the evaporative cooling process is used to cool an oil-like substance or liquid which is mixed with the water prior to the evaporative cooling. In another embodiment of the invention, the evaporatively cooled water is used as a bath in which the oil-like liquid is bubbled through the cooled water.

In both cases, it is clear, that the oil-like substance is in direct contact with the cooled water.

Since it is an oil-like substance, it is easily separatable from the water through variously known methods. One such method for separating two liquids is described by the article "Decanting Without Interface Control" by Geoffrey S. Mason appearing in the Chemical Engineering magazine of Sept. 20, 1982, on page 129-130, incorporated hereinto by reference. The Mason article describes a two or three baffled decanter equipped with two level controllers.

Another method for separating the oil and water is through natural gravitational effects in which the oil and water are allowed to to rest in a resevoir type arrangement, thereby allowing the lighter oil to rise to the top and form an oil layer while the water remains at the lower level.

In this context, the use of water is the preferred evaporative medium; although, other liquids may be used which generate other desireable effects, such as ether, freon, etc. These liquids, although more expensive in use, allow operation of the present invention in colder environments and additionally generate lower temperatures.

Within this context, the term oil-like liquid or substance preferrably has a very low vapor pressure so as not to vaporize when mixed with the water in the evaporative process. The preferred vapor pressure of the substance is approximately 6 millimeters of mercury or less at the maximum operating temperature to limit the fire hazard. Also, it is preferred that the oil be as near odorless as possible so as not to create a distastful environment for the human operators. It is clear, that other substances such as mercury could be used in this context. A good article which described the vapor pressure of oils is "Fundamentals of Fire and Explosion" by Daniel R. Stull appearing in the AIChE monograph series, number 10, volume 73, 1977, published by the American Institute of Chemical Engineers, incorporated hereinto by reference.

The cooled oil-like substance is used to pre-cool the air stream destined to become the final product air. This pre-cooling is made by way of direct contact between the oil and the air flow. In the preferred embodiment, the oil is filtered over a grid type of arrangement so that the passing air is cooled by the oil. Another embodiment sprays the oil as fine droplets into the air stream; this method is also beneficial for the first stage cooling process. Also preferred for this application is an entrainment or an empingement separator to keep oil droplets from being carried along with the air flow.

In the discussion herein, air is used to descibe the gas which is cooled. It is intended that the invention not be limited to merely air cooling but rather include any gas. Hence, it is clear that the use of the oil-like liquid to cool the gas is applicable to nitrogen gas as well as other gases known to those in the art.

The air flow, so cooled, is a dry cool air flow. That is, it contains no other water vapor than it initially had prior to cooling. The pre-cooling did not require any evaporative cooling. This cool dry air stream is highly desireable in many applications where the water vapor would be either uncomfortable or unsuited to either the operators or machinery which is cooled by the air.

In the preferred embodiment the air is passed on to a second stage cooling system which utilizes an evaporative process similar to that which was described earlier. This second stage cools the air stream to an even lower temperature, thereby achieving an enhanced cooling effect on the environment affected by the air product.

It is well known in the art, that the use of evaporative cooling is much more economical in operation than a refrigerated air environment; similiarly, since the present invention eliminates the need for mechanical heat exchangers the captial expense is reduced dramatically.

DRAWINGS IN BRIEF

FIG. One is a block diagram of one embodiment of the invention.

FIG. Two is a block diagram of a second embodiment of the invention in which the oil is bubbled through a vat of chilled water.

FIG. Three is a pictorial diagram of an emodiment of the invention.

DRAWINGS IN DETAIL

Referring to FIG. One, a blower, 101 generates an air stream which is passed through a cooling tower or spray chamber in phase one, 114. An oil stream 102, is mixed with a water stream 103 so that the droplets intermix. As these droplets pass through the air stream generated by blower 101, an evaporative process takes place in which a portion of the water is vaporized, thereby cooling both the water and the oil droplets. The oil and water mixture is allowed to settle into reservoir 104 and separate into an oil strata 105 and a water strata 106. The water is recycled from its strata 106 to spray 103.

The oil strata 105 is extracted and sprayed 108 to form droplets within phase 2, 115. Air blower 107 blows air across the oil droplets from spray 108 and therefore generates a cool "dry" air stream 110. The oil droplets 108 are collected in reservoir 109 and recycled back up to the spray 102 in phase 1, 114.

Phase 2, 115 therefore generates a cool dry air stream 110 which could be used as a product by and of itself. In a preferred embodiment the cool dry air stream 110 is passed through another evaporative process, phase 3, 116, in which water from spray 111 is allowed to evaporate and further cool the air stream to produce the product air 113. The water droplets from spray 111 are collected in reservoir 112 and are recycled for an ever continuing process. Phase 3, 116 is permitted to chill to its maximum effect since the air it receives, 110 is cool and dry.

Referring to FIG. Two, phase 1, 214, utilizes water droplets 201 which are evaporativly cooled by direct contact with an air stream generated by blower 202. Reservoir 203 collects the cooled water droplets. The cooled water 205 is passed through a bath 204 in which oil 206 is bubbled through the cold water. This direct contact between the oil 206 and the cooled water 205 transfers the cooling effect to the oil.

The cooled oil is utilized in a spray 208 for direct contact with an air stream generated by blower 207. This direct contact transfers the cooling affect to the air stream to generate a cool dry air stream 210. The oil is collected in reservoir 209 is again cycled through bath 204.

The cool dry air 210 is further evaporatively cooled by spray 211 to generate the product air 213. The spray 211 is collected in reservoir 212 and cycled there around.

It is clear that phase two, 215, generates a cool dry air stream which is capable of being a product by and of itself. Phase three, 216, is able to further cool the air because the air from phase two, 215, is cool and dry.

Referring to FIG. Three, a single common air stream, 301 is utilized to perform the two separate functions as discussed in FIG. One and FIG. Two. A portion of the air stream 301 is passed through phase 1, 302, the water-/oil application. Phase 1, 302, may be either of the embodiments discussed in connection with FIG. One or FIG. Two. The waste air 303 generated by phase 1, 302, is usable to discharge heated air from an attic or the such.

Another portion of the air stream 301 is passed through the phase 2 oil cooling, 304, and passes naturally through phase 3, 305, of the water evaporative cooling. This air stream generates the product air 307.

It is clear from the foregoing that the present invention provides an economical and highly effective method of cooling air. Not only is the air cooled to a much higher degree then previously known, but the air from phase 2 may be utilized for a cool dry environment.

What is claimed is:
1. A gas cooling system comprising:
  A. means
    1. for cooling a first liquid, and
    2. for placing said first liquid in direct contact with a oil-like liquid, thereby cooling said oil-like liquid; and
  B. means for placing the cooled oil-like liquid in direct contact with a gas stream, thereby cooling said gas stream.
2. The gas cooling system according to claim 1 wherein said first liquid includes water.
3. The gas cooling system according to claim 1 further comprised of means for further cooling the cooled gas stream.
4. The gas cooling system according to claim 3 wherein said means for further cooling the cooled gas stream is comprised of means for placing said gas stream in direct contact with a second liquid.

5. The gas cooling system according to claim 4 wherein said first liquid and said second liquid include water.

6. The gas cooling system according to claim 3 wherein said means for cooling, said means for placing the cooled second liquid, and said means for further cooling include pack towers.

7. The gas cooling system according to claim 3 wherein said means for cooling, said means for placing the cooled second liquid, and said means for further cooling include spray chambers.

8. An air cooling system comprising
   A. means for directly contacting an oil-like liquid with a first cooled water;
   B. means for directly contacting said oil-like liquid with an air stream, thereby producing a primary cooled air stream; and
   C. means for further cooling said primary cooled air stream to a secondary cooled air stream by direct contact with a second cooled water.

9. The air cooling system according to claim 8, further including means for separating said oil-like liquid and said first cooled water after being placed in direct contact.

10. The air cooling system according to claim 9 wherein said means for directly contacting an oil-like liquid with a first cooled water includes means for mixing said oil-like liquid and said first cooled water.

11. The air cooling system according to claim 9 wherein said means for directly contacting an oil-like liquid with a first cooled water includes means for bubbling said oil-like liquid through a bath of said first cooled water.

12. The air cooling system according to claim 11 further including evaporative means for cooling said first cooled water prior to said means for directly contacting an oil-like liquid with a first cooled water.

13. The air cooling system according to claim 9 further including means for creating the air stream.

14. An air cooling system comprising:
   A. A first coolant transfer means having,
      1. means for mixing an oil-like liquid and water,
      2. means for evaporatively cooling said mixture, and
      3. means for separating said mixture into a cooled oil-like liquid and water;
   B. A second coolant transfer means having means for placing said cooled oil-like liquid in direct contact with an air stream, thereby producing a first cooled air stream; and
   C. A third coolant transfer means having means for evaporatively cooling said first cooled air stream to a second cooled air stream.

15. The air cooling system according to claim 14 further including means for creating said air stream.

16. The air cooling system according to claim 14 wherein said means for evaporatively cooling said mixture of the first coolant transfer means includes a packed tower, and wherein said third coolant transfer means includes a packed tower.

17. An air cooling system comprising:
   A. means for evaporatively cooling a first water supply;
   B. means for bubbling an oil-like liquid through said cooled water supply, thereby producing a cooled oil-like liquid;
   C. means for placing said cooled oil-like liquid in direct contact with an ambient air stream, thereby producing a primary cooled air stream; and
   D. means for evaporatively cooling the primary cooled air stream to a secondary cooled air stream.

18. The air cooling system according to claim 17 further including means for producing said ambient air stream.

* * * * *